Jan. 1, 1957 M. ALDEN 2,776,181

SEPARABLE SUPPORTS FOR RECORDER ELECTRODES

Filed Dec. 11, 1952 6 Sheets-Sheet 1

Inventor
Milton Alden
by Roberts, Cushman & Grover
attys.

Jan. 1, 1957 M. ALDEN 2,776,181

SEPARABLE SUPPORTS FOR RECORDER ELECTRODES

Filed Dec. 11, 1952 6 Sheets-Sheet 2

Inventor
Milton Alden
by Roberts, Cushman & Grover
att'ys.

Jan. 1, 1957 M. ALDEN 2,776,181

SEPARABLE SUPPORTS FOR RECORDER ELECTRODES

Filed Dec. 11, 1952 6 Sheets-Sheet 3

Inventor
Milton Alden
by Roberts, Cushman & Grover
Att'ys.

SEPARABLE SUPPORTS FOR RECORDER ELECTRODES

Filed Dec. 11, 1952

Inventor
Milton Alden
by Roberts, Cushman & Grover
Att'ys.

Jan. 1, 1957 M. ALDEN 2,776,181

SEPARABLE SUPPORTS FOR RECORDER ELECTRODES

Filed Dec. 11, 1952 6 Sheets-Sheet 5

Inventor
Milton Alden
by Roberts, Cushman & Grover
att'ys.

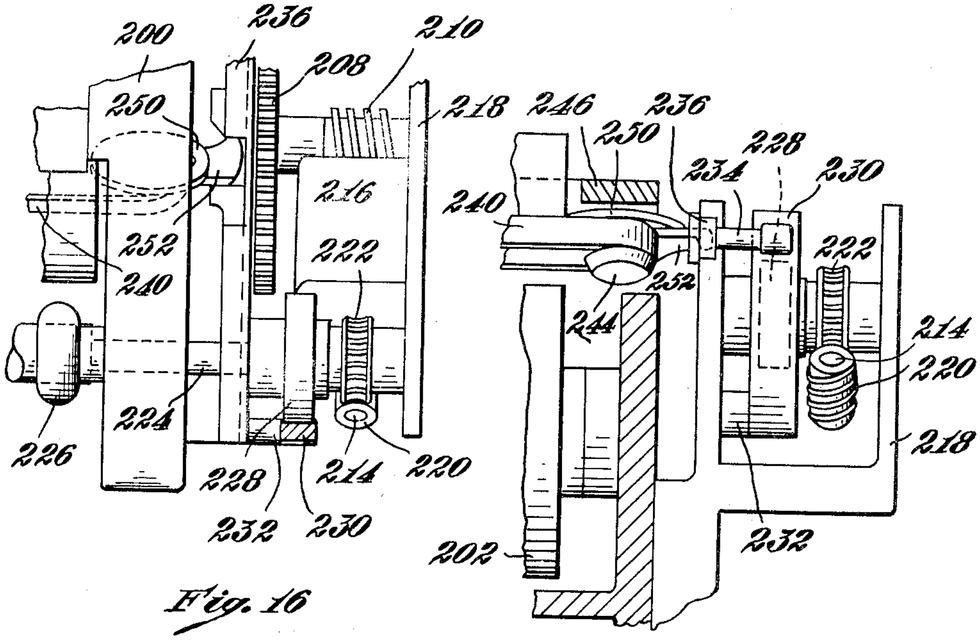
Fig. 16, Fig. 17
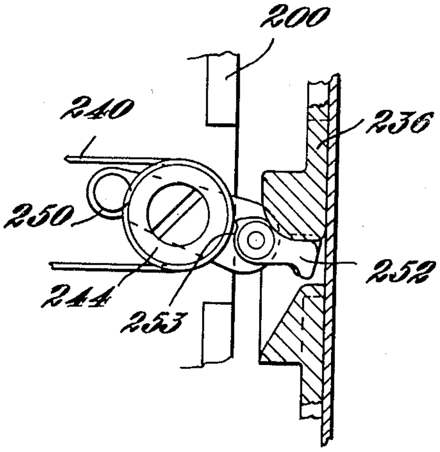
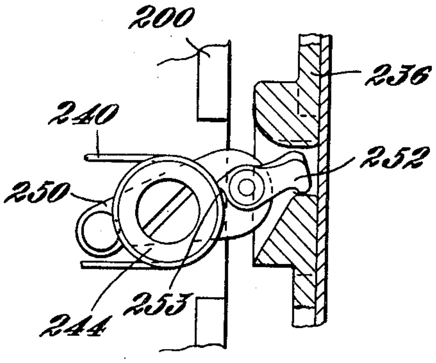
Fig. 19
Fig. 18
Inventor
Milton Alden
by Roberts, Cushman & Grover.
Att'ys

United States Patent Office 2,776,181

Patented Jan. 1, 1957

2,776,181

SEPARABLE SUPPORTS FOR RECORDER ELECTRODES

Milton Alden, Wellesley, Mass.

Application December 11, 1952, Serial No. 325,416

3 Claims. (Cl. 346—74)

This application is a continuation-in-part of my copending application for Recorder, Serial No. 149,182, filed March 11, 1950, now U. S. Patent No. 2,621,999. In the aforesaid application there is disclosed a recording of the kind wherein a sheet or web of electrosensitive paper is fed between two recording elements or electrodes which are moved relatively to each other to trace successive lines transversely of the direction in which the paper is fed. The electrodes are contained within a compartmentalized housing together with a spool of recording paper, sheet feeding means and sheet smoothing means and the novel aspect of this application resides in improved means for mounting the foregoing component parts so that they will be readily accessible for inspection, adjustment and repair or replacement of the parts without substantial dismantling of the machine.

In accordance with the foregoing the electrodes are mounted respectively on two separable supports with a housing for one of the supports from which the one support is removable when the two supports are separated. The one support carries, in addition to its electrode, the sheet feeding means and the means for smoothing the wrinkles from the sheet and this support rests on and is removably attached to the housing. The other support carries the other electrode, is pivotally mounted on the housing and forms a cover for the housing.

For the purpose of illustration a typical embodiment of the invention is shown in the accompanying drawings in which—

Figs. 16 and 17 are enlarged fragmentary views showing the details of the blade feed mechanism of the embodiment illustrated in Figs. 13 through 15;

Figs. 18 and 19 are enlarged fragmentary sectional views on line 18—18 of Fig. 14 showing the dog in its extreme positions; and Fig. 20 illustrates a modification.

Figure 1:
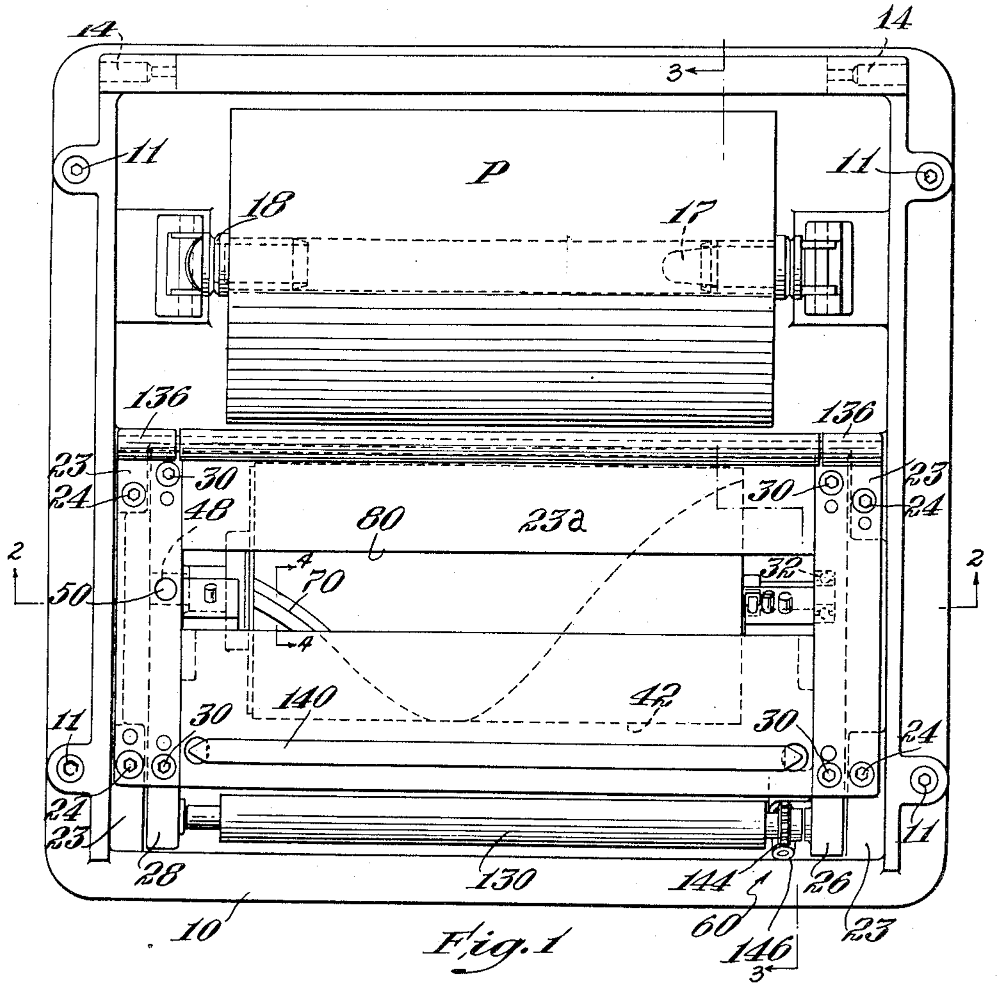
Fig. 1 is a plan view of one embodiment of the invention with the cover removed.
Figure 2:
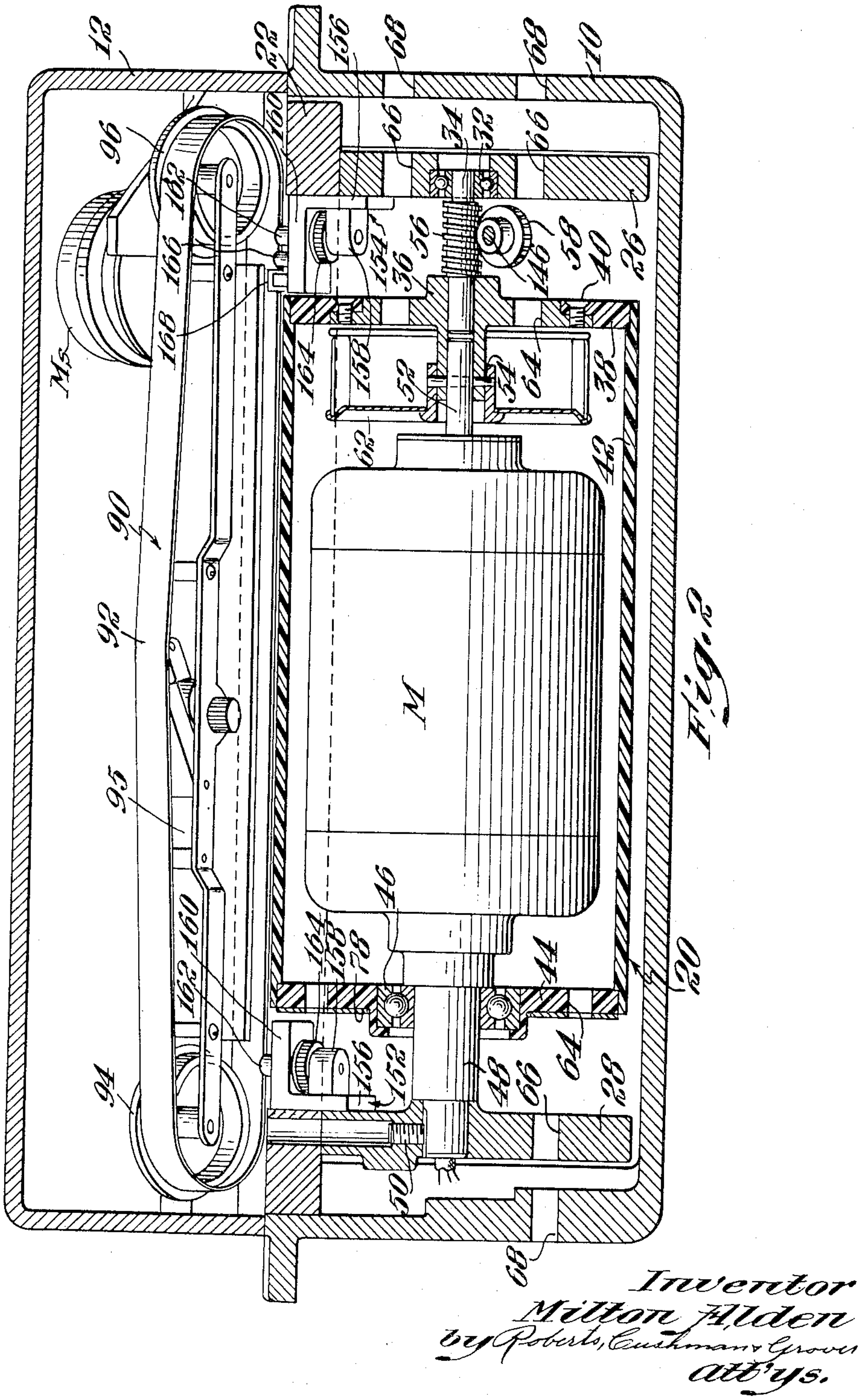
Fig. 2 is a sectional view on line 2—2 of Fig. 1.
Figure 3:
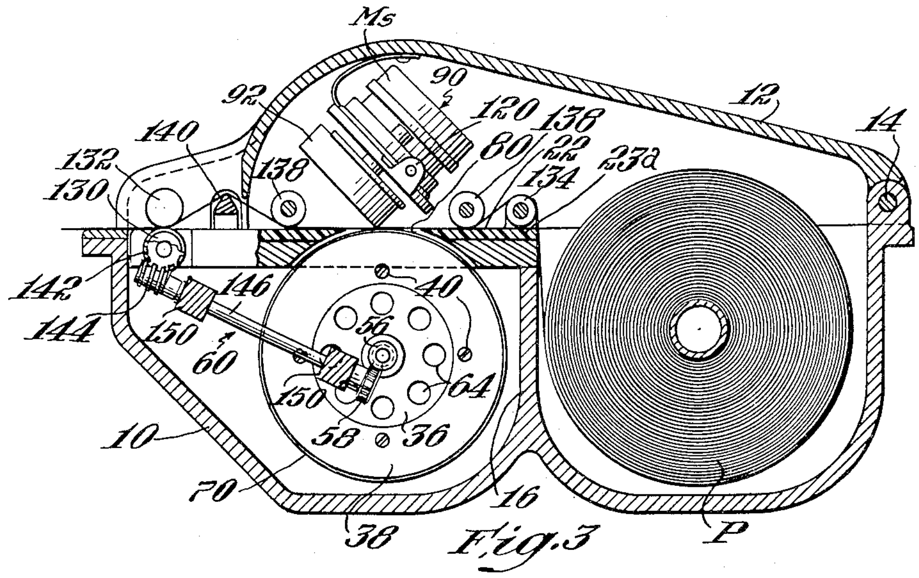
Fig. 3 is a sectional view on line 3—3 of Fig. 1.

Referring to Figs. 1 through 3, the first embodiment of the invention chosen for purposes of illustration comprises a recorder with a flanged housing or casing 10 preferably cast and having a cover 12 attached thereto by means of hinges 14. Leveling screws 11 are provided in the casing flange for mounting the recorder upon a supporting structure (not shown). The casing 10 is divided into two compartments by means of a vertical wall or baffle 16. In one of these compartments is a roll of electrosensitive recording paper P wound upon a spool or bobbin which is preferably supported by means of a shaft 17 (Fig. 1) and pivot 18.

The second compartment houses a recording element designated generally as 20 (Fig. 2). To this end the top of such compartment is closed by a plate 22 on the top of which is a platen 23*a* of insulating material over which the web of the recording paper P is drawn from the roll as will be described hereinafter. The plate 22 is supported upon four bosses 23 located respectively in the four corners of the compartment, the plate being secured to the top of the bosses by means of cap screws 24. Depending from the bottom surface of the plate 22 in spaced relationship are two brackets 26 and 28. Interconnection between the brackets and the plate 22 is made by means of cap screws 30 which pass through the plate threadingly to engage the respective brackets.

The bracket 26 is provided with a recess wherein is held the outer race of a ball bearing 32 (Fig. 2). The inner race of the bearing carries one end of a sub shaft 34, the other end of which engages the aperture in the hub of a spider 36. Arranged circumjacent the spider 36 is an annular ring 38 of an insulating material such as a suitable plastic, the ring and spider being attached to each other by means of a lap joint secured by flat headed screws 40 so that the ring and spider form one head for a cylinder 42 which together with the opposite head 44 comprises the drum assembly of the recording element 20. The head 44 is of a nonconducting material and is provided with a recessed hub wherein is carried the outer race of a ball bearing 46. The inner race of the bearing 46 engages a hollow stub shaft or finger 48 one end of which is attached to the frame of an electric motor M. The opposite end of the finger 48 is reduced in diameter so that it engages an aperture in the bracket 28. Relative movement between the finger 48 and the bracket 28 is prevented by a set screw 50 which engages threads at the bottom of an aperture in the bracket so that the end of the screw is brought into contact with a flat upon the end of the finger. The rotatable shaft 52 of the motor M projects into the aperture in the spider hub 36, relative rotation therebetween being prevented by means of a pin 54. From the above it will be apparent that the energization of the motor M from a power source (not shown) by leads extending out for example through the hollow finger 48 will result in the rotation of the recording element 20 in the bearings 32 and 46.

The motor M is also used to operate the paper feed mechanism. To this end a worm 56 is secured to or cut integrally upon the portion of the stub shaft 34 between the bearing bracket 26 and the spider hub 36 which worm engages a gear 58 to form a part of a speed reduction unit 60 (Fig. 3) described in detail hereinafter. To prevent overheating of the motor M, a fan 62 (Fig. 2) is secured to the spider hub 36 by means of the pin 54 which also couples the hub to the shaft 52 of the motor M as described heretofore. Rotation of fan 62, as the motor M operates, circulates air through the apertures 64 in the cylinder heads 44 thereby to ventilate the interior of the cylinder 42. Additional breather apertures 66 and 68 are incorporated respectively in the brackets 26 and 28 and in the side walls of the casing 10.

Figure 4:
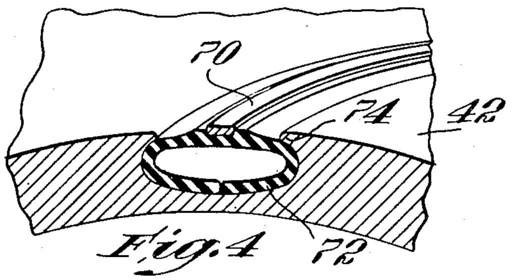
Fig. 4 is an enlarged fragmentary view on line 4—4 of Fig. 1.
Figure 7:
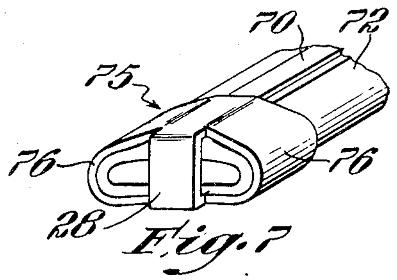
Fig. 7 is a fragmentary view showing the means for securing the end of the conducting helix to the resilient member.
Figure 5:
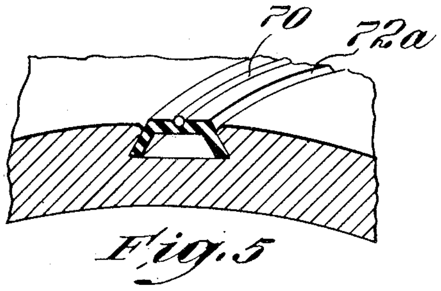
Fig. 5 is a view similar to Fig. 4 showing an alternative construction.
Figure 6:
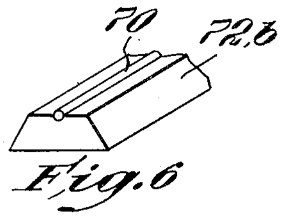
Fig. 6 is a fragmentary view of one type of resilient mounting for the conducting helix.

The conducting portion of the recording element 20 comprises a strip or ribbon 70 of conducting material disposed about the outer periphery of the cylinder 42 as a single turn of a helix. Such conducting strip 70 may be either rectangular or circular in cross section, and preferably although not necessarily carried upon a resilient tubular member 72 such as shown in Fig. 4. When a resilient member is used, it is preferably retained by the shoulders 74 of a slot helically disposed in the outer surface of the cylinder 42. Alternative resilient members 72a and 72b are shown in Figs. 5 and 6 respectively. Each end of the conducting strip 70 is secured by a clip 75 (Fig. 7) having two oppositely disposed tabs 76 which are bent around the resilient member 72 and a tongue 78 bent down and under the end of the member 72 so that the tongue comes into electrical contact with an annular disc 78 (Fig. 2) of conducting material attached to the outer surface of the head 44 which acts as a slip ring whereby one terminal of an input signal source is connected to the strip 70 by means of a brush or other sliding member (not shown) which makes electrical contact with the disc.

The brackets 26 and 28 are proportioned with respect to the diameter of the cylinder 20 so that the cylinder projects through a transverse slot 80 (Fig. 1) in the platen 23 with its surface substantially tangent to the plane of the upper surface of the plate thus bringing the conductor 70 into contact with the web of recording paper P.

Figure 11:
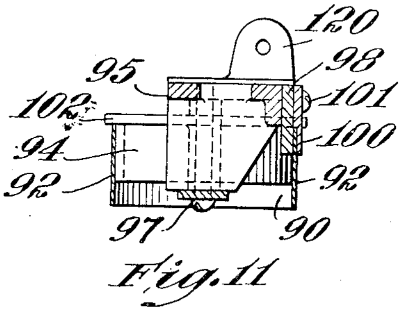
Fig. 11 is a section on line 11—11 of Fig. 8.

As is best shown in Figs. 8 through 11, a recording element assembly 90 is pivotally mounted upon the cover 12 so that the effective recording portion thereof is in the vertical plane passing through the axis of the drum assembly. The recording element 90 comprises a thin strip or blade 92 of flexible conducting material such as stainless steel, whose ends are joined, for example by means of butt welding, to form a continuous loop. This loop extends between two spaced rolls or pulleys 94 and 96 which are journaled in bearings at the respective ends of a supporting frame 95. As is best shown in Fig. 11, the pulley 94 is an idler being rotatably secured to the end of the frame 95 by means of a capscrew and washer 97. The second pulley 96 is continuously driven by a very low speed motor M*s* which is mounted upon the top of the frame 95 so that the blade 92 is moved around the pulleys 94 and 96 at a rate to compensate for wear and erosion. As the blade 92 is moved, the portion thereof whose lower edge forms the effective recording edge slides between a flat elongated portion 98 (Fig. 11) of the frame 95 and a backing member such as the strip 100 which is secured to such flat portion by means of screws 101, the strip having an offset portion adjacent the flat portion thereby forming a slot which engages the top portion of the blade. Upward movement of the blade 92 is further restrained by flanges 102 upon the pulleys 94 and 96.

Figure 8:
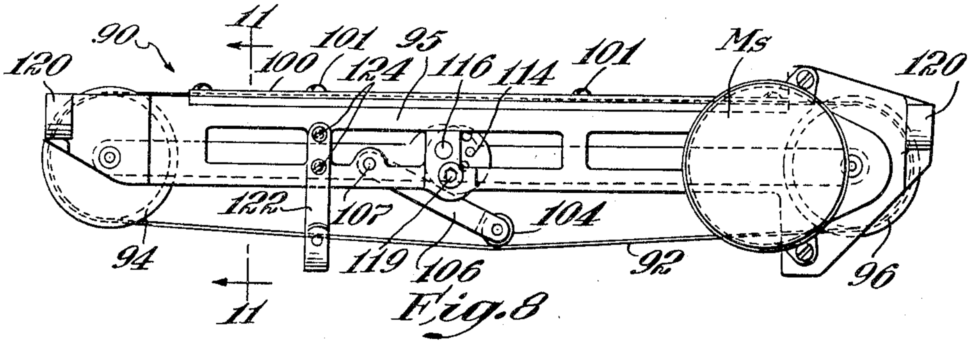
Fig. 8 is a plan view of the top electrode assembly.
Figure 9:
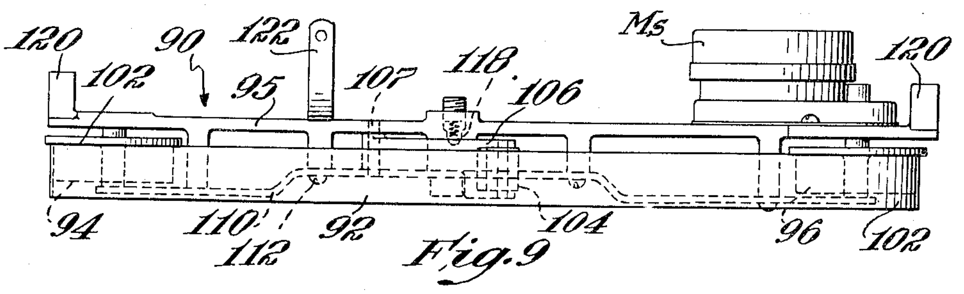
Fig. 9 is a side elevation view of the assembly shown in Fig. 8.
Figure 10:
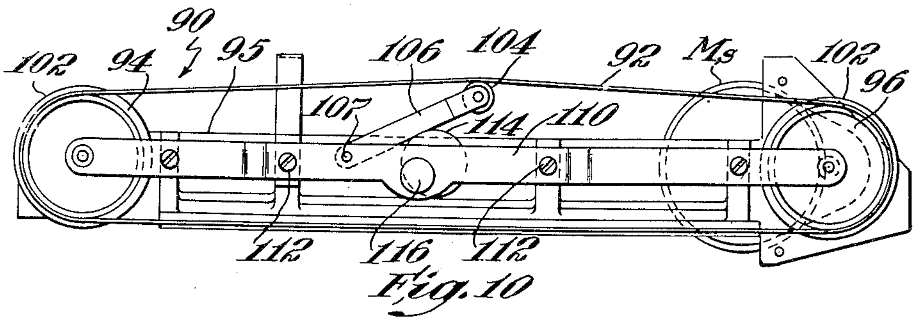
Fig. 10 is a bottom view of the assembly shown in Figs. 8 and 9.

An idler roll 104 (Fig. 8) is carried upon the end of an arm 106 pivotally mounted as at 107 between the frame 95 and a strap member 110 which is secured to the frame by screws 112. The arm 106 is positioned by means of cam 114 so that the roll 104 contacts the inner surface of the portions of the loop 92 opposite the portion secured by the backing strip 100, as described above, thus tensioning the loop. The cam 114 is carried upon a pin 116 whose ends are journaled in the frame 95 and the strap member 110 respectively. The end of the pin 116 journaled in the member 110, which extends beyond such member, is knurled permitting adjustment of the position of the cam, and therefore of the amount of tension in the loop. The adjusted position of the cam 114 is maintained by a lock comprising a spring loaded ball 118 (Fig. 9) which selectively engages recesses in the top of the cam as is shown in Fig. 8. The ball biasing spring is maintained under compression by means of a set screw 119 which engages a threaded aperture in the frame 95.

The recording element 90 is pivotally suspended from the cover 12 by means of two apertured tabs or ears 120 located respectively at opposite ends of the frame 95. The above mentioned pivotal connections between the recording element 90 and the cover 12 are located so that when the cover 12 is in the closed position, as is shown in Fig. 3, the lower effective recording edge of the blade 92 is in contact with the web of the recording paper P in a vertical plane through the axis of rotation of the drum assembly. The plane of the effective portion of the blade 92 preferably is arranged as is shown in Fig. 3 so that such plane makes an acute angle of approximately 60 degrees with the plane of the paper web thereby reducing scuffing and abrasion of the paper. Such angular mounting has the additional advantage of permitting the inherent flexibility of the blade 92 to accommodate any misalignment and unbalance in the drum assembly, an important consideration in high speed operation.

The recording element 90 is brought into contact under pressure with the paper web by the force exerted by a bent leaf spring 122, one end of which is secured to the frame 95 by means of screws 124. The opposite end of the spring is attached to the cover in a similar manner as is shown in Fig. 3.

Fig. 3 also illustrates the path of the web of electrosensitive paper P through the recorder. As the web is unrolled from the bobbin by feed rolls 130 and 132, it passes over an idler roll 134 journaled in two bearing brackets 136 (Fig. 1), thence under two idler rolls 138 journalled in the cover in spaced relationship so that the web is held against the platen 23a, thence over the apex of a smoothing bar 140 having a substantially triangular cross-section, and thence through the feed rolls 130 and 132. The top roll 132 is an idler which is journaled in the cover 12. The associated driven roll 130 is journaled in the brackets 26 and 28 and is provided with a gear 142. Meshing with the gear 142 is a worm 144 carried upon a shaft 146, the other end of which carries the above mentioned gear 58 of the speed reduction unit 60. The shaft 146 is journaled in bearing brackets 150 projecting from the side of the casing 10.

When the cover 12 is closed as is shown in Fig. 3, the relationship of the effective edge of the recording strip 92 is determined by two stop assemblies 152 and 154 (Fig. 2) supported near the top of the inner surfaces of the brackets 28 and 26. The assembly 152 comprises an L-shaped bracket, one leg 156 of which is secured to the side of the bracket 28. A tab 158 projects normally from the leg 156 parallel to the second leg 160 so that a slot is formed therebetween. A hardened stop pin 162 engages threaded aligned apertures in the arm 160 and the tab 158 so that the upper end thereof can be brought into contact with the lower effective recording edge of the strip 92. The pin 162 is locked in adjusted position by means of a knurled circular nut 164 which is located in the slot formed between the tab 158 and the arm 160.

Figure 12:
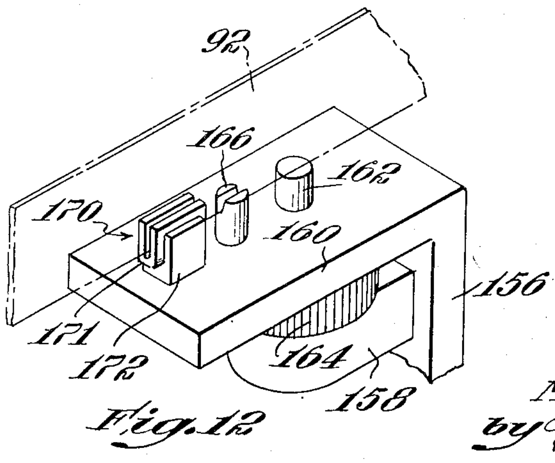
Fig. 12 is a fragmentary isometric view showing the details of the blade reconditioning device.

As is shown in Fig. 12, the stop assembly 154 is similar in construction to the assembly 152 described above; but has projecting from the top of the arm 160, in addition to the stop pin 162, blade reconditioning means including a hone 166 and a wiper 170. The hone 166 consists of a block of abrasive material having a slot in the top thereof through which the blade 92 is moved by the motor M*s* so that burrs and irregularities are removed thereby. The wiper 170 comprises a piece of leather 171 or similar material folded and held in a spring clip 172 so that the blade 92 passes between the folds.

Figure 13:
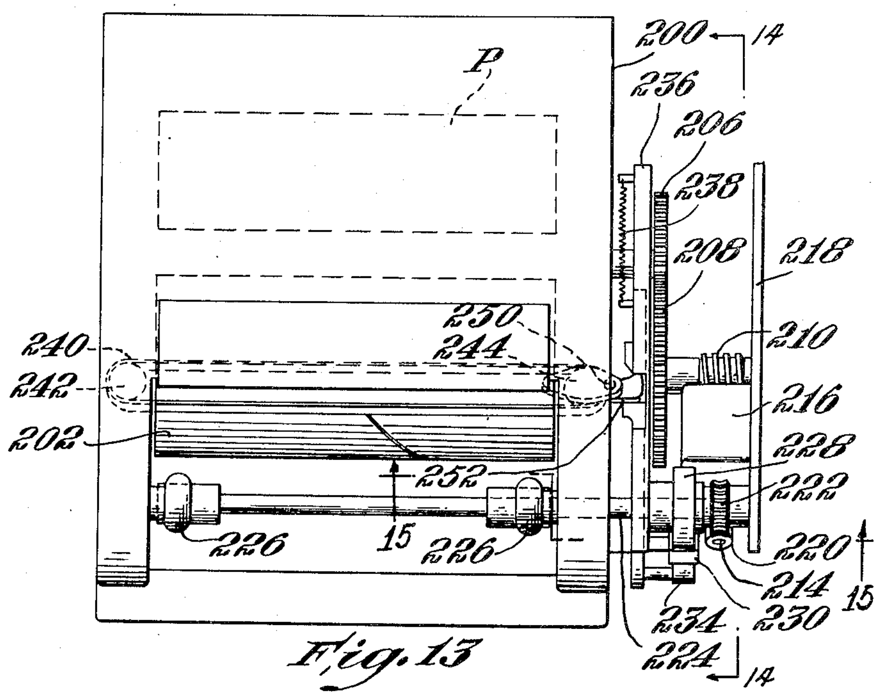
Fig. 13 is a plan view of a second embodiment of the invention.
Figure 14:
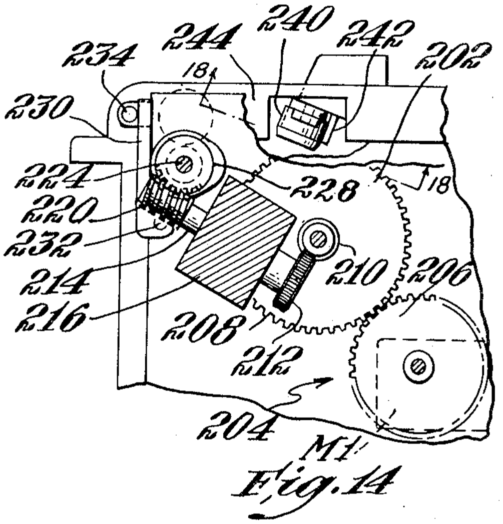
Fig. 14 is a fragmentary sectional view on line 14—14 of Fig. 13.
Figure 15:
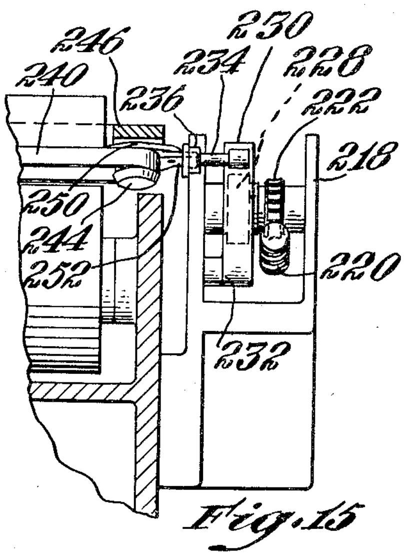
Fig. 15 is a fragmentary sectional view on line 15—15 of Fig. 13.

The above described recorder incorporating electrodes including a moving blade in the form of a loop and a resiliently mounted helical conductor permits operation at a drum speed of 1800 R. P. M. or more as compared with ordinary recorders of this type which have been limited to drum speeds in the order of 300–360 R. P. M. by the abrasion of the paper and lack of definition in the copy. It is also possible to move the blade electrode in other ways. For example the recorder shown in Figs. 13 through 15 employs a "hitch" feed for the blade whereby the blade is moved in successive steps rather than continuously. As is shown in Fig. 13, this recorder is generally similar to the recorder described in detail heretofore, having a casing 200 wherein is housed a roll of recording paper P and a drum 202 with a helical conductor superimposed upon its outer periphery preferably by means of a resilient member in a manner similar to that described heretofore in connection with the cylinder 42. As is shown in Fig. 14, the drum driving motor M1 is located outside of the drum 202 and is coupled thereto by means of a speed reducing unit 204 comprising the meshing gears 206 and 208 which are attached to the shafts of the motor and drums respectively. The drum shaft also carries a worm 210 which engages a gear 212 secured to one end of a short shaft 214 journaled in a bracket 216. The bracket 216 is in turn carried by a plate 218 which is attached to the side of the casing 200. The opposite end of the shaft 214 carries a second worm 220 engaging a gear 222 upon a shaft 224 whereon are mounted two paper feed rolls 226 (Fig. 13).

The shaft 224 also carries a cam 228 (Fig. 16) which is in contact with a cam follower 230 pivotally connected at its lower end to the side of the casing 200 as at 232. The upper end of the follower 230 is in contact with an arm 234 extending normally from a slidable member 236 carried in a groove in the top of the side of the casing 200. The member 236 is biased by means of a spring 238 (Fig. 13) so that the arm 234 is maintained in contact with the cam follower 230.

The movable blade 240 is again made in the form of a loop extending between two rolls such as the pulleys 242 and 244 journaled at the respective ends of a frame 246. In this instance both pulleys are idlers, and the tensioning means is eliminated so that the blade 240 fits rather loosely about the pulleys. The driving motor is also dispensed with, the power for moving the blade 240 being obtained from the drum motor M1 as will be described below.

Pivotally mounted upon the same shaft as the pulley 244 is an arm 250 which in turn has a dog 252 pivotally mounted upon its projecting end. One end of the dog 252 engages a slot in the slidable member 236 as is best shown in Figs. 18 and 19.

The opposite end of the dog 252 has a raised cammed surface formed by the side of a finger 253 which protrudes from the end of the dog as is best shown in Figs. 18 and 19. This cammed surface generally conforms to the shape of the adjacent portion of the blade 240 so that when the slidable member 236 is retracted by the spring 238 to position the dog 252 as is shown in Fig. 18, the cammed surface slides over the surface of the blade. As rotation of the cam 228 moves the slidable member 236 towards the front of the recorder, the dog pivots about the end of the arm 250 thus wedging the blade 240 between the cammed surface of the dog and the pulley 244. Further forward movement of the slidable member 236 pivots the arm 250 about the shaft of the pulley 244 so that the blade 240 is moved about the pulley in a counterclockwise direction as viewed in Fig. 19. Upon the return movement of the slidable member 236 by the springs 238, the cammed surface of the dog 252 releases, any reverse movement of the blade 240 during such release being more than overcome by the blade movement in the opposite direction so that the net movement advances the blade in a series of steps.

It will be readily appreciated that the use of the above described "hitch" feed is not limited to use with a blade formed into a loop, but is equally applicable to advance an expendable blade strip unwound from a reel or spool, thence past the effective recording position and thence onto a receiving reel. Alternatively to rewinding upon a receiving reel the used blade may be periodically cut off by the operator as it leaves the recorder.

In the appended claims the expression "elongate one of the electrodes" is intended to refer to the recording element 90 suspended from the cover 12, the "trunnion" is the hollow stub shaft or finger 48, one end of which is attached to the frame of the electric motor M, and the "separable supports" are the cover 12 hinged to the housing and the plate 22 which is supported by and secured to bosses at the corners of the second compartment.

It should be understood that the present disclosure is for the purpose of illustration only and that this invention includes all modifications and equivalents which fall within the scope of the appended claims.

As illustrated in Fig. 20 the smoothing bar 140', corresponding to 140 in Figs. 1 and 3, may be electrically heated by passing current therethrough, thereby to dry the sheet as it is drawn over the bar.

From the foregoing it will be understood that the rolls 134 and 138 cause the paper to follow a circuitous path and therefore tend to hold the paper taut in the region of the electrodes, and of course this tendency can be augmented in various ways as by braking the rolls.

I claim:

1. In a recorder having two opposed recording electrodes and feeding means for advancing a sheet on a path between the electrodes, a housing, a cover pivotally attached to the housing to swing between open and closed position, means on said cover for yieldingly supporting one of said electrodes, a bracket in said housing for supporting the other electrode, said electrodes being held in recording relation when said cover is closed, and said bracket being arranged to be detachably inserted in said housing when said cover is open whereby said bracket and other electrode may be easily removed as a unit when said cover is open without disassembly of said housing or unit, and positioning means on said bracket in the path of said one electrode as the cover is moved to closed position, said positioning means engaging said one electrode positively to locate it relative to the other electrode irrespective of mislocation of said bracket relative to said cover.

2. In a recorder having two opposed recording electrodes and feeding means for advancing a sheet on a path between the electrodes, a housing, a cover pivotally attached to the housing to swing between open and closed position, means on said cover for supporting one of said electrodes, a bracket in said housing for supporting the other electrode, said electrodes being held in recording relation when said cover is closed, and said bracket being arranged to be detachably inserted in said housing when said cover is open whereby said bracket and other electrode may be easily removed as a unit when said cover is open without disassembly of said housing or unit, and means carried by said bracket for engaging one side of the sheet only and smoothing wrinkles from the sheet, said sheet-smoothing means being positioned relative to said other electrode to extend into the path of the sheet, whereby engagement of the sheet by said smoothing means is assured despite variations of the location of said bracket in said housing.

3. A recorder according to claim 2 wherein the sheet-feeding means is mounted on said bracket thereby definitely to locate the path into which said smoothing means extends.

References Cited in the file of this patent

UNITED STATES PATENTS

| | | |
|---|---|---|
| 2,391,765 | Artzt | Dec. 25, 1945 |
| 2,453,484 | Young | Nov. 9, 1948 |
| 2,532,271 | Finch | Nov. 28, 1950 |
| 2,537,512 | Crissey | Jan. 9, 1951 |
| 2,548,583 | Boyajian et al. | Apr. 10, 1951 |
| 2,572,462 | Finch | Oct. 23, 1951 |
| 2,575,959 | Hogan | Nov. 20, 1951 |
| 2,639,211 | Hallden et al. | May 19, 1953 |